United States Patent [19]

Haney et al.

[11] Patent Number: 4,650,236

[45] Date of Patent: Mar. 17, 1987

[54] AUTOMATIC PIPE ELEVATOR

[75] Inventors: Keith M. Haney; Clyde A. Willis, both of Wichita Falls, Tex.

[73] Assignee: W-N Apache Corporation, Wichita Falls, Tex.

[21] Appl. No.: 712,213

[22] Filed: Mar. 15, 1985

Related U.S. Application Data

[63] Continuation-in-part of Ser. No. 522,490, Aug. 12, 1983, Pat. No. 4,522,439.

[51] Int. Cl.$^4$ .............................................. B25J 15/00
[52] U.S. Cl. .................................. 294/110.1; 294/116
[58] Field of Search ....................... 294/88, 110.1, 116, 294/101, 102.1, 115, 90, 118, 100, 104; 24/242, 232, 251, 243, 248; 74/99 R

[56] References Cited

U.S. PATENT DOCUMENTS

| | | | |
|---|---|---|---|
| Re. 26,284 | 10/1967 | O'Neill et al. | |
| 3,257,144 | 6/1966 | Gardner | 294/110.1 |
| 4,013,178 | 3/1977 | Brown et al. | 294/102.2 |
| 4,017,112 | 4/1977 | Delest | 294/110.1 |
| 4,303,270 | 12/1981 | Adair | |
| 4,314,611 | 2/1982 | Willis | |
| 4,522,439 | 6/1985 | Haney | |

FOREIGN PATENT DOCUMENTS

| | | |
|---|---|---|
| 248508 | 3/1926 | United Kingdom |
| 296171 | 8/1928 | United Kingdom |

Primary Examiner—James B. Marbert
Attorney, Agent, or Firm—Willian Brinks Olds Hofer Gilson & Lione Ltd.

[57] ABSTRACT

An elevator for drill pipe which includes at least two jaws for supporting a length of pipe and structure for maintaining the jaws in clamping engagement with the pipe. The structure includes linkage means coupled to the jaws for maintaining the jaws clamped to the pipe when the elevator and pipe are urged apart by gravity due to the weight of the pipe as when the pipe is raised or otherwise supported by the elevator. Additionally or alternatively, the elevator includes a pressure actuator assembly connected to the jaws for applying a positive force against the jaws for maintaining the jaws clamped to the pipe independent of the effect of gravity and, thus, independent of the orientation of the elevator.

31 Claims, 17 Drawing Figures

AUTOMATIC PIPE ELEVATOR

CROSS-REFERENCE TO RELATED APPLICATION

This is a continuation-in-part application of U.S. patent application Ser. No. 522,490 filed Aug. 12, 1983, now U.S. Pat. No. 4,522,439.

Reference is also made to copending, commonly assigned U.S. patent application Ser. No. 430,943, filed Sept. 30, 1982, by C. A. Willis, the disclosure of which is incorporated herein by reference.

BACKGROUND OF THE INVENTION

This invention relates to an improved elevator assembly adapted for use with a well-drilling apparatus preferably, a top head drive type of such apparatus, in order to lift or lower drilling or production tubulars quickly and efficiently. This invention is equally applicable to running drill strings, consisting of diverse sizes of drill collars and drill pipe, into or out of a well bore, and to running diverse sizes of casing or production tubing into or out of a well bore, and all with or without rotating the string of tubulars in the hole and with or without circulating mud or other fluids through the string of tubulars.

In a wide variety of well-drilling operations, it is necessary to assemble a drill string from a large nuxber of individual lengths of drill pipe as a borehole is being drilled. When it becomes necessary for any reason to remove the drill string from a borehole, as, for example, to replace worn drill bits, the drill string must be progressively raised as successive lengths of drill pipe are brought to the surface and removed from the drill string. Well servicing requires similar equipment, which, in smaller sizing, is used to pull or replace sucker rods, production piping, etc., for pump service, replacement of worn pipes or rods, or during well cleanout to improve production.

One type of drilling apparatus in widespread use utilizes a power swivel which is threadedly coupled to the uppermost length of drill pipe and then used to raise the drill string and to remove the uppermost length of drill pipe from the string. Once this has been accomplished, the threaded connection between the power swivel and the uppermost length of drill pipe is broken; and means, such as a transfer arm, can then be used to move the length of drill pipe from the vertical position aligned with the borehole to a horizontal position at ground level.

This prior art approach to raising a drill string and successively removing lengths of drill pipe from the string is not entirely acceptable It requires that the power swivel be threadedly coupled to each successive length of drill pipe and that this threaded connection then be broken. These repeated threading and unthreading operations can significantly slow the rate at which drill pipe can be removed from a borehole, and, in addition, can cause undesirable wear on the threaded connections of the swivel and of the drill pipe.

It is, therefore, an object of this invention to provide an improved apparatus useful in removing drill pipe from a borehole and, in particular, to provide such an apparatus which does not require threaded connections between the apparatus and the drill pipe and which can be used to increase the rate at which drill pipe can be removed from a borehole.

A further object of the invention is to provide an elevator for drill pipe that will operate reliably at any angle, and not only in a substantially vertical mode.

An additional object of the invention is to provide an elevator that can be controlled from a remote location and that will provide increased safety and reliability in operation.

SUMMARY OF THE INVENTION

According to the present invention, an elevator for drill pipes is provided which comprises:

at least two jaws, each jaw having a clamping surface;

a connector member for supporting the jaws; and linkage means for coupling the jaws to the connector member and for maintaining the clamping surfaces of the jaws in clamping engagement with a drill pipe when the connector member and drill pipe are urged apart relative to one another, the linkage means being configured such that the force by which the clamping surfaces clamp the drill pipe increases as the force urging the connector member and the drill pipe apart increases.

According to a further aspect of the invention, an elevator for drill pipes is provided which comprises:

at least two jaws, each jaw having a clamping surface and being supported for movement between a first open position and a second closed position in which the clamping surfaces are in clamping engagement with a drill pipe; and a pressure actuator assembly connected to the jaws for maintaining the jaws in the second closed position in clamping engagement with the drill pipe.

The elevator of the present invention provides the important advantage that it operates to clamp and then release lengths of drill pipe without any threaded connection between the elevator and the drill pipe. As a result, wear on the threads of the drill pipe is eliminated; and rapid clamping and unclamping of drill pipe by the elevator is made possible.

According to one embodiment of the invention, an elevator is provided which relies essentially on the force of gravity, i.e., the weight of the supported drill pipe(s) to maintain the jaws of the elevator in firm clamping engagement with the drill pipe as it is being supported or raised by the elevator. According to an alternative embodiment, a pressure actuator assembly is included in the elevator to positively maintain the jaws in clamping engagement with the drill pipe, and can be used in addition to or in lieu of reliance on the force of gravity to maintain the jaws firmly and reliably clamped against the drill pipe. This embodiment, in particular, provides the advantage that it is usable within boreholes drilled at substantially any angle with respect to the surface, and is especially suitable for use on automated and/or remotely controlled drilling or well service rigs.

With the present invention, the speed with which a drill pipe can be removed from a borehole is increased; and the manpower requirements for operating the elevator are reduced to a minimum.

The invention, together with further objects and attendant advantages thereof, will best be understood by reference to the following detailed description of presently preferred embodiments thereof taken in conjunction with the drawings.

BRIEF DESCRIPTION OF THE DRAWINGS

FIGS. 9 and 10 are perspective views of the "near side" and the "far side" index subassemblies in FIG. 7;

FIG. 11 is a sectional view taken in the plane of FIG. 2, showing the elevator in a locked-open position;

FIG. 12 is a sectional view taken in the plane of FIG. 7, showing the elevator in a locked-open position;

DETAILED DESCRIPTION OF THE PREFERRED EMBODIMENTS

Figure 1:
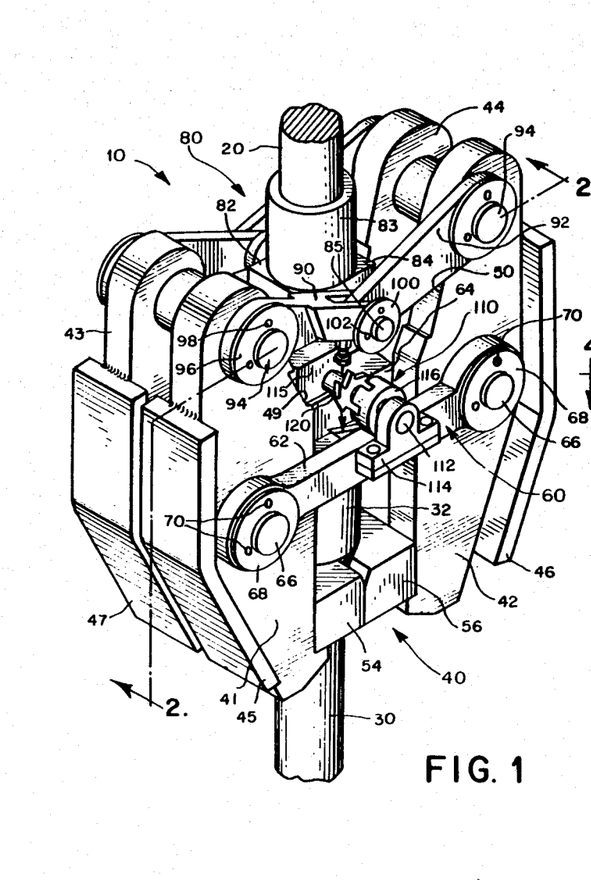
FIG. 1 is a perspective view of a presently preferred embodiment of the elevator of this invention.
Figure 2:
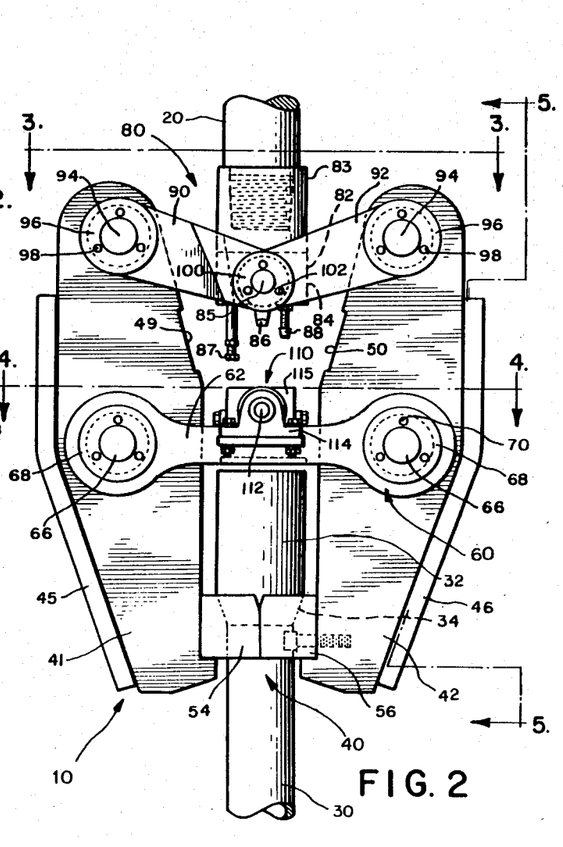
FIG. 2 is an elevation view taken along line 2—2 of FIG. 1.
Figure 3:
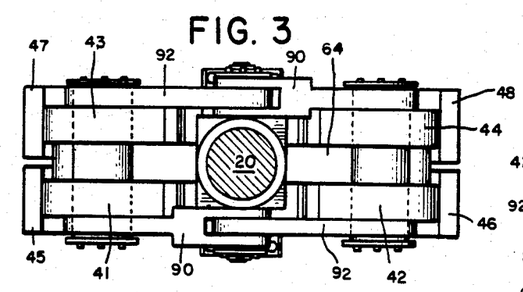
FIGS. 3, 4, and 5 are top, sectional, and side views taken along lines 3—3, 4—4, and 5—5 of FIG. 2, respectively.
Figure 4:
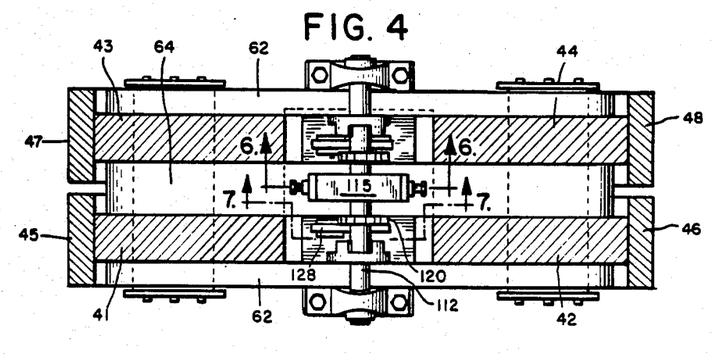
Figure 5:
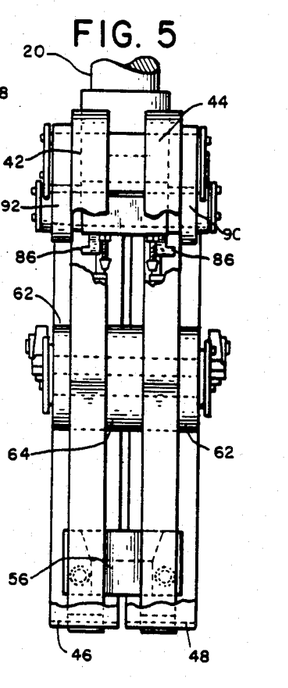
Figure 6:
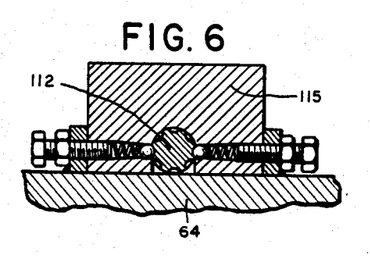
FIGS. 6 and 7 are expanded partial sectional views taken along lines 6—6 and 7—7 of FIG. 4.
Figure 7:
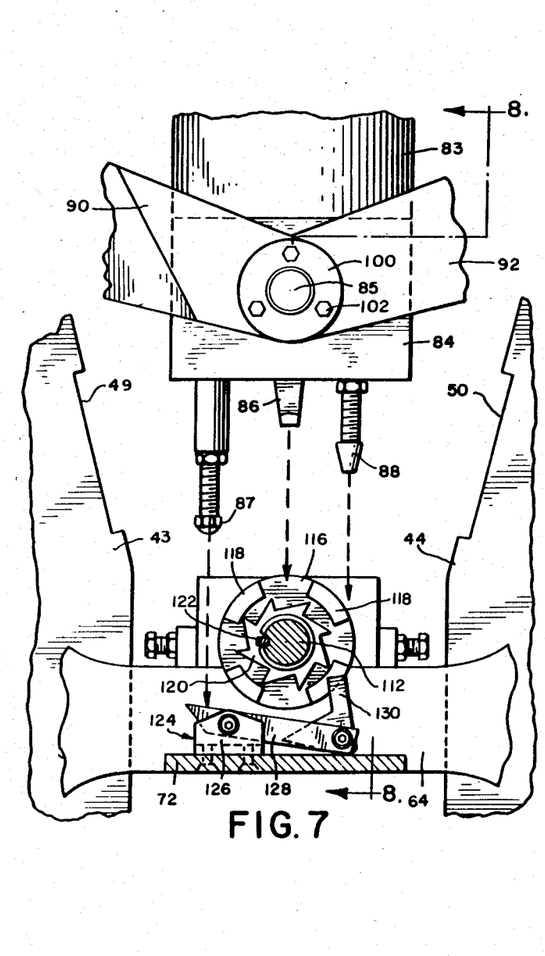
Figure 8:
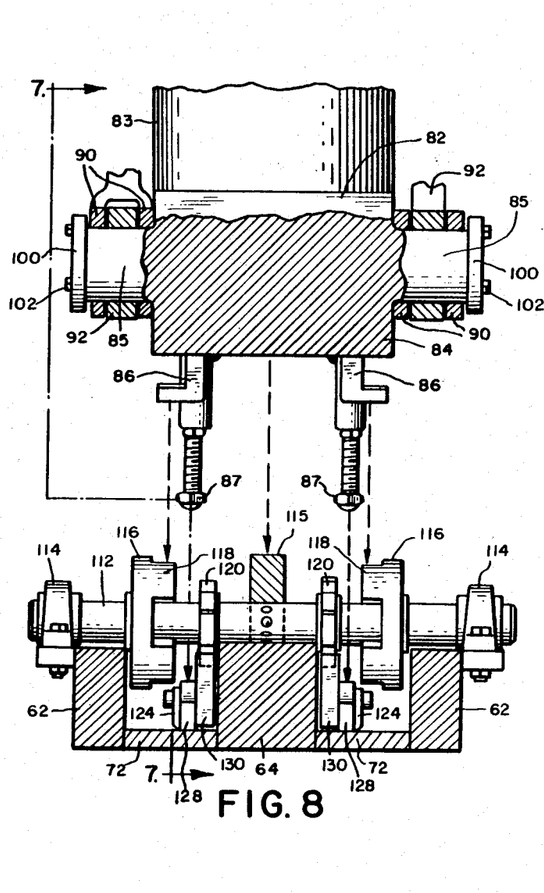
FIG. 8 is a sectional view taken along line 8—8 of FIG. 7.
Figures 9, 10, 11, 12:
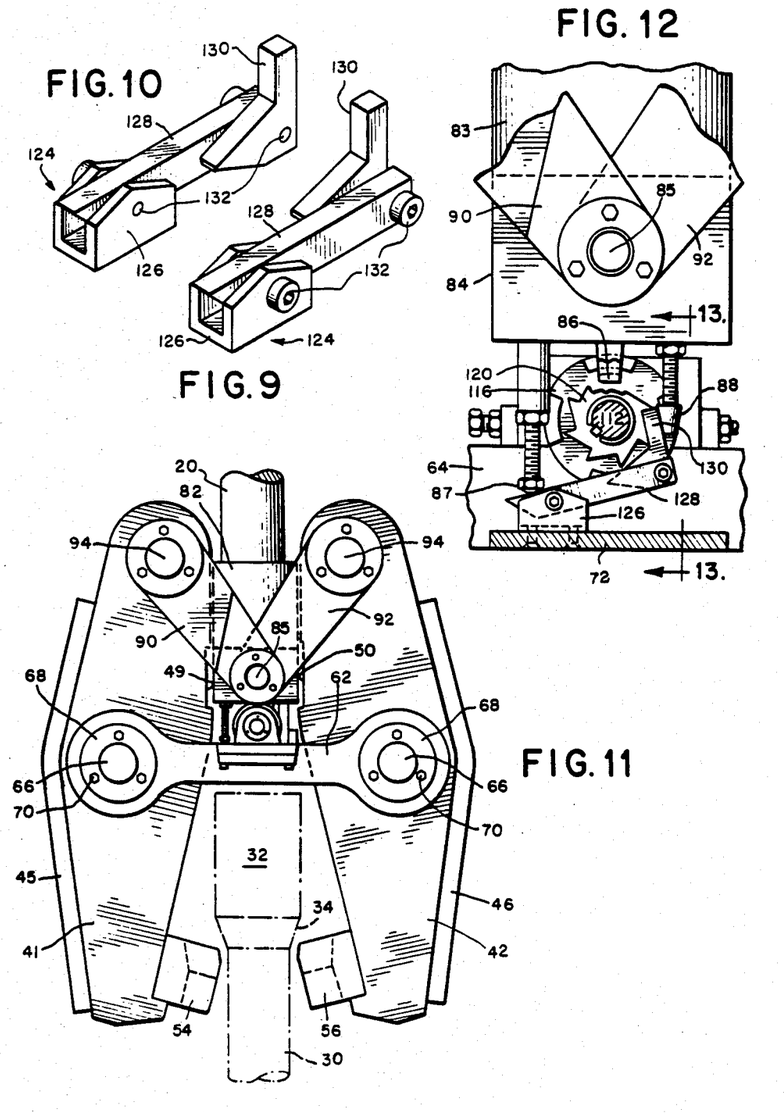
Figure 13:
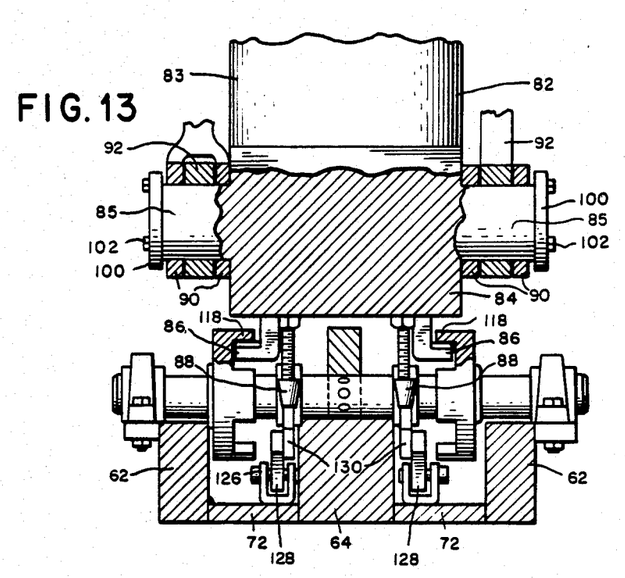
FIG. 13 is a sectional view taken along line 13—13 of FIG. 12.

FIGS. 1-13 show various views of a first embodiment of the elevator of this invention, FIGS. 11-13 showing in particular the elevator in a locked-open position, so as to maintain the jaws in an open position to receive or release a length of pipe, or to allow jaw inserts to be changed to accommodate different sizes of pipe.

As shown in the FIGS., the elevator 10 is mounted to a swivel saver sub 20, which is, in turn, suspended from a power swivel. The swivel saver sub 20 is a subassembly suspended from the swivel to save wear and tear on the swivel. When threaded and unthreaded many times, the worn swivel saver sub 20 can be replaced, saving the swivel from all but one threading and unthreading operation. A particular type of swivel used to suspend and rotate the elevator 10 does not form part of this invention and is, therefore, not shown. A wide range of swivels can be used to support the elevator of this invention such as, for example, that shown in U.S. Pat. No. 4,314,611.

The elevator 10 is configured to clamp the box end 32 of a length of drill pipe 30 and, in particular, to bear against the shoulder 34 that forms the lower end of the box end 32.

The elevator 10 is made up of at least three, and preferably four, major components: a jaws assembly 40, a central linkage assembly 60, an upper linkage assembly 80, and, preferably, a jaws-locking mechanism 110.

The jaws assembly 40 comprises two jaws, each of which comprises two of the jaw elements 41-44. Each of the jaw elements 41-44 is provided with a jaw element backing 45-48 to provide dimensional stability and weight to the jaws, for rapid closure when the jaws-locking mechanism is unlocked. If desired, the jaw elements 41-44 can be provided with indent lips 49-50, to provide clearance between the jaw elements and the connector block 82 of the upper linkage assembly 80.

Each jaw is provided with a clamping surface shaped to support a length of pipe. This is most conveniently provided by means of jaw inserts 54, 56, one jaw insert for each jaw, bridging and connecting the lower portion of two jaw elements. The jaw inserts 54, 56 can be shaped to support one side of a length of drill pipe and a drill pipe shoulder at the end of the drill pipe, and can advantageously be designed so as to be easily changeable (for example, by means of screws) to accommodate different sizes of pipe.

The central linkage assembly 60 preferably comprises a plurality of parallel central linkage elements. In the embodiment shown in FIGS. 1-13, the central linkage assembly comprises two, outer, central linkage elements 62 and one inner central linkage element 64 parallel to and between the outer central linkage elements. The jaws and central linkage elements are joined by two central link pins 66 about which the jaw elements 41-44 or central linkage elements 62, 64, or, preferably, both the jaw elements and the central linkage elements, pivot. In the event both the jaw elements and central linkage elements do not pivot about pins 66, they both pivot about the axis of pins 66.

The central link pins 66 are retained within the jaws and central linkage elements by keeper disks 68, which have an outside diameter larger than the outside diameter of the pin, the keeper disks 68 being attached to central link pins 66 by any convenient means such as screws 70. The keeper disks (both in this location and others, as described below) can be solid disks or can be provided with central round or other shaped openings, for example, to allow access to grease fittings, or to allow a portion of the link pins to protrude through the keeper disks.

The parallel central linkage elements 62 and 64 are joined together with spacer plates 72 to form a platform against which the upper end of a pipe section can be urged.

The upper linkage assembly 80 comprises two upper linkages, each upper linkage comprising a plurality of parallel upper linkage elements, joining the upper end of the jaws to a central connector block (or simply "connector") 82 from which the elevator is suspended. In the embodiment shown in FIGS. 1-13, the connector block 82 has a topmost cylindrical portion 83, a central rectangular solid portion 84, and two sideward projecting cylindrical portions which constitute a pin 85 about which the lower end of each upper linkage pivots. Instead of pin 85 being joined to the central connector, the central connector and the lower end of one of the upper linkages could pivot about the pin joined to the lower end of the other upper linkage; or the lower end of each of the upper linkages and the central connector could all pivot about a common pin.

Figure 14:
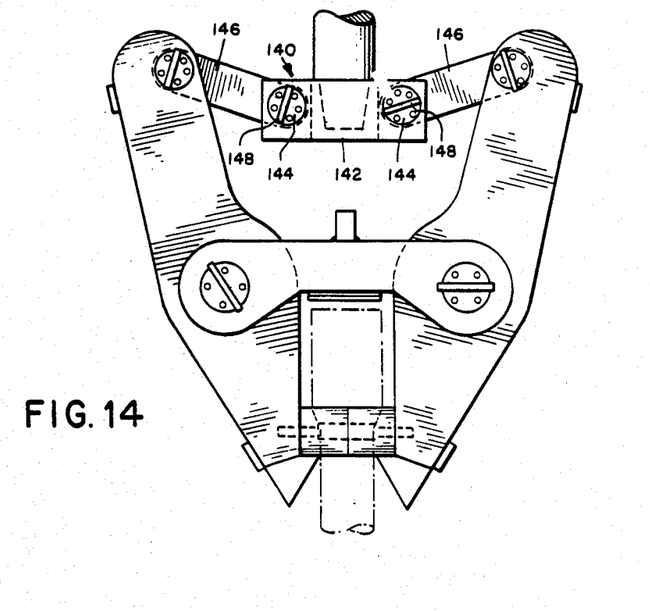
FIG. 14 is an elevation view of an alternative embodiment of the present invention, showing an alternate upper linkage system.

According to an alternate form of the invention illustrated in FIG. 14, the alternate upper linkage assembly 140 could comprise a connector block 142 and two connector block pins 144 for the lower portions of the two upper linkages 146. Also shown in FIG. 14 is an alternate method of securing the pins, namely, replacing the keeper disks with pin bars 148.

It is preferred, however, that the pins be secured with keeper disks, as described above with respect to the central linkage assembly.

Returning to the embodiment illustrated in FIGS. 1-13, in the device illustrated, the upper linkage comprises a pair of forked upper linkage elements 90 and straight upper linkage elements 92, the lower end of the straight upper linkage elements fitting within the forked lower portion of the forked upper linkage elements 90. Again, similar to the central linkage assembly, the jaws are joined to the upper linkage elements by two upper link pins 94 about which the upper end of the jaw elements or the upper end of the upper linkage elements, or preferably both, pivot. The upper link pins 94 are, according to the embodiment illustrated in FIGS. 1-13, retained within the jaws and upper linkages by keeper disks 96 having an outside diameter larger than that of the pins 94, the keeper disks being attached to each end of each pin 94 by any appropriate means such as screws 98.

Likewise, the common pin 85 which is an integral portion of the central connector 82 is retained within the lower end of the upper linkages by a pair of connector block keeper disks 100 having an outside diameter larger than that of the pin 85, the keeper disks being attached to each end of the pin 85 by any appropriate means such as screws 102.

In the embodiment of FIGS. 1-13 of the present invention, the elevator comprises a jaws-locking mechanism 110 which constitutes means for locking the jaws open to receive or release a length of pipe or to allow changing the jaw inserts 54, 56 to accommodate a different size of pipe, and for unlocking the jaws to allow closure over and clamping of a length of pipe. Preferably, the locking means is so configured to be responsive to an urging together of the platform which comprises the central linkage elements and the central connector to lock the jaws open, if unlocked, and responsive to an urging together of the platform which comprises the central linkage elements and the central connector to unlock the jaws, if locked open.

According to the embodiment shown in FIGS. 1-13, the means for locking the jaws open and for unlocking the jaws comprises:

(a) at least one latch lug hook, preferably two latch lug hooks 86, depending from the central connector 82, for holding the central connector in a position near the central linkage when the hook is engaged;

(b) at least one latch lug wheel 116 (i.e., one for each latch lug hook) mounted upon a latch shaft 112, each of the latch lug wheels 116 being provided with at least one latch lug 118 for engaging the latch lug hook 86 which depends from the central connector; and (c) ratchet means for rotating the shaft and latch lug wheels, responsive to an urging together of the platform which comprises the central linkage elements, and the central connector.

According to the embodiment illustrated, a latch shaft 112 is rotatably mounted on inner central linkage element 64 by means of pillow block bearings 114. A centrally located straddle bar 115 acts as a vertical overtravel stop and contains rotation stop detents (see FIG. 6) to insure exact rotation step positions for latch shaft 112 in the short vertical (neutral) stroke before the latch lugs 118 engage the latch lug hooks 86. The straddle bar 115 acts primarily as a bending restraint. The weight of shaft 112 and the parts suspended from the shaft 112 are supported by pillow block bearings 114. Two ratchet wheels 120 of the ratchet means and two latch lug wheels 116 are each keyed to the latch shaft 112 by key 122 so that the ratchet wheels, latch lug wheels, and latch shaft all rotate in concert. The amount of rotation for each urging together of the platform and the central connector is $\frac{1}{2}n$ of a revolution, where n is the number of latch lugs on the latch lug wheel, preferably four. In other words, in the preferred embodiment illustrated, there are four latch lugs for engaging each of the two depending hooks. Each action of the ratchet means rotates the ratchet wheels and, therefore, the latch shaft and the latch lug wheels, $\frac{1}{8}$ of a revolution, thereby engaging the latch lugs with the latch lug hooks if they are not engaged, but disengaging the latch lugs from the latch lug hooks if they are engaged.

The ratchet means further also preferably comprises a pair of index projections or studs 87 on the lower end of the central connector, so configured to activate the ratchet means. The ratchet means preferably comprises an index subassembly means 124, which, in turn, comprises two index pivot blocks 126, one mounted on each of the spacer plates 72 which join the outer central linkage elements 62 to the inner central linkage element 64; two index pivot bars 128, one pivotably mounted on each index pivot block 126, for urging an index dog 130 upward responsive to downward urging by the index projections 87 which depend from connector block 82; a pair of index dogs 130, one pivotably mounted on each index pivot bar 128, for urging the ratchet wheels and thereby the latch shaft 112, the latch lug wheel 116, and latch lugs 118 about the axis of latch shaft 112; and a pair of index stops 88 which depend from connector block 82 and engage the back surface of the approaching ratchets to prevent momentum overtravel beyond $\frac{1}{8}n$ revolution.

The index projections 87 preferably include means such as index bolts mounted at the end of the index projections for adjusting the length of the index projections to insure proper operation of the ratchet mechanism.

The index dogs 130 are preferably attached to the index pivot bars 128, and the index pivot bars 128 attached to the index pivot blocks 126, by means of shoulder screws 132 for ease of adjustment. The other attachments are preferably by means of standard hex-head capscrews, each provided with a lock washer (not shown). Furthermore, the pins 66, 85 and 94 are preferably provided with one or two grease fittings per pin, likewise not shown.

The operation of the device illustrated in FIGS. 1-13 is described as follows. Starting from a locked-open position, the pipe elevator is lowered over a vertical section of pipe 30, the flat upper end of which touches the platform formed of the central linkage elements 62, 64 and the spacer plates 72 between the central linkage elements, urging the connector block 82 and central linkage elements 62, 64 together. Index projections 87 activate index pivot bars 128, urging index dogs 130 into ratchet wheel 120 and causing $\frac{1}{8}$ of a revolution of latch shaft 112. Latch lug wheel 116 containing four latch lugs 118 is likewise rotated $\frac{1}{8}$ of a revolution, thereby disengaging latch lugs 118 from depending hooks 86. The jaws are then allowed to fall around the upper end of the length of drill pipe 30, grasping the box end 32 of the drill pipe 30. Raising the swivel saver sub 20 causes the jaws to grasp the pipe firmly, which can then be pulled upwards the requisite amount.

When the next joint becomes accessible, slips are engaged around the second topmost length of drill pipe to hold the string of pipe; and the topmost length of pipe is disengaged, using either a wrench or tongs. The power swivel and elevator are used to finish unscrewing the thread at the lower end of the pipe in the elevator.

A boom is brought in and clamped to the now disconnected topmost section of drill pipe. The power swivel is lowered against the top end of the drill pipe, again opening the jaws and activating the ratchet to lock the jaws in an open position. The elevator can then be raised to remove the elevator from the pipe; the disconnected drill pipe section can be removed for storage; and the process can be repeated with a new section of pipe. When the drill bit has been replaced, or whatever other action which required removal of the drill pipe has been accomplished, the entire process can be repeated in reverse to lower the drill pipe into the hole, section by section.

Figure 15:
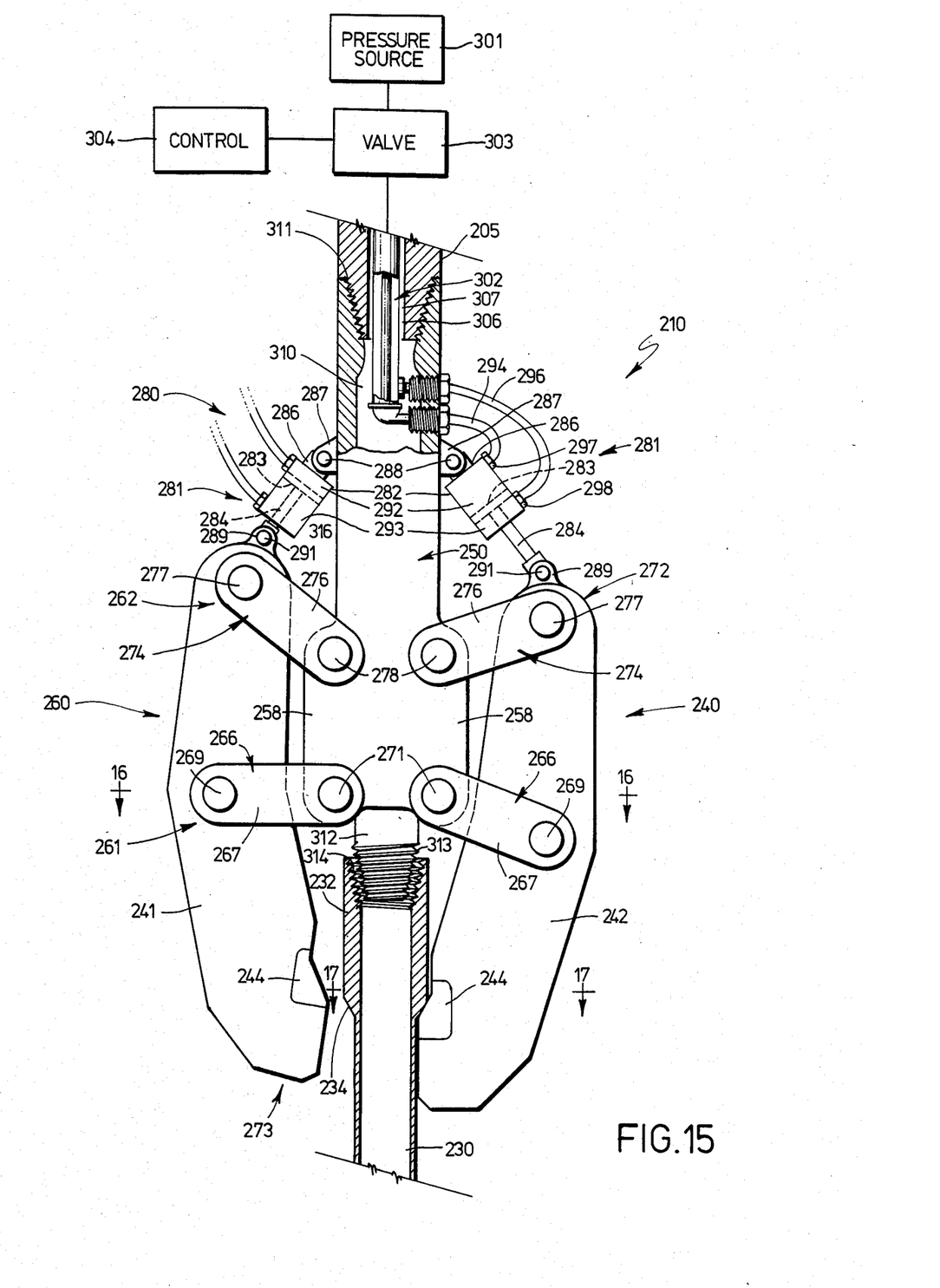
FIG. 15 is an elevation view of a further alternative embodiment of an elevator according to the invention.
Figure 16:
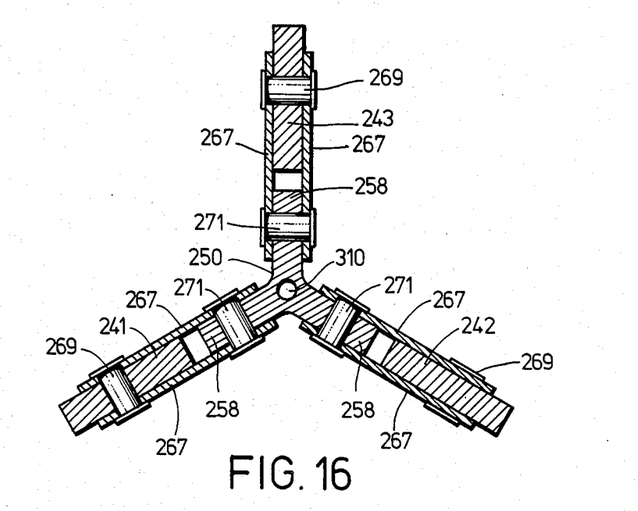
FIG. 16 is a sectional view of the elevator of FIG. 15 looking in the direction of arrow 16—16 in FIG. 15.
Figure 17:
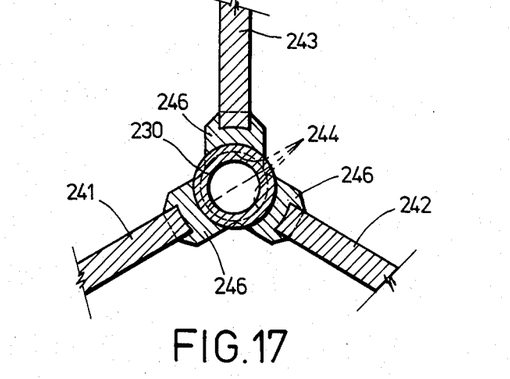
FIG. 17 is a sectional view of the elevator of FIG. 15 looking in the direction of arrow 17—17 in FIG. 15.

FIGS. 15-17 illustrate an elevator according to an alternative embodiment of the present invention. This elevator is generally designated by reference numeral 210 and is adapted to be mounted to a swivel saver sub 205 which, in turn, is suspended from a power swivel (not shown) as in the previous embodiments. Also as in the previous embodiments, elevator 210 is configured to clamp the box end 232 of a section of drill pipe 230 and, in particular, to bear against the shoulder 234 that forms the lower end of the box end 232.

Elevator 210 generally comprises a jaws assembly 240, a central connector member 250, a linkage assembly 260, and a pressure actuator assembly 280. In the embodiment illustrated in FIGS. 15-17, the jaws assembly 240 comprises three jaws 241, 242, and 243 which are substantially identical to one another and are substantially equally spaced around the elevator at approximately 120° intervals as best shown in FIG. 16. It should be understood, however, that elevator 210 could also comprise two jaws or greater than three jaws, if desired; and it is not intended to restrict the invention to any particular number of jaws.

Each jaw is provided with a clamping surface 244 positioned adjacent the lower ends 273 of the jaws and shaped to support a length of the pipe 230. If desired, the clamping surfaces may be provided on removable inserts 246 mounted to the jaws as schematically shown in FIG. 17 and changeable to accommodate different sizes of pipe.

The elevator also includes a central connector member 250 for supporting the jaws assembly 240 and a linkage assembly 260 for connecting the jaws assembly to the central connector member. The linkage assembly 260 includes a first linkage assembly portion 261 and a second linkage assembly portion 262. The first linkage assembly portion 261 includes three linkages 266, one of which connects each of the jaws 241, 242, and 243 to the central connector member 250. More particularly, each linkage 266 comprises a pair of links 267 having one end mounted to opposite sides of a jaw and the opposite end mounted to opposite sides of an extended portion 258 of the central connector member 250 adjacent the lower end of the central connector member. Each pair of links is preferably mounted to its respective jaw by a link pin 269 extending through aligned apertures in the jaw and in the one end of each link 267, and to its respective extended portion 258 by a link pin 271 extending through aligned apertures in the extended portion and in the opposite end of each link 267. The link pins can be retained in position by means of keeper disks or pin bars attached to the link pins as in the previously described embodiments.

Linkages 266 which comprise first linkage assembly portion 261 are preferably connected to the jaws at an intermediate position on the jaws generally centrally between the top end 272 and the bottom end 273 of the jaws, and the link pin mountings are adapted to permit relative pivotal movement between the jaws and the linkages and between the linkages and the central connector member.

The second linkage assembly portion 262 also includes three linkages 274 connecting each of the three jaws to the central connector member 250. In particular, each linkage 274 comprises a pair of links 276, one end of which is mounted to opposite sides of each jaw by a link pin 277 extending through aligned apertures in the jaw and in the one end of each link 276 and the opposite end of which is mounted to the opposite sides of the extended portion 258 of central connector member 250 by a link pin 278 extending through aligned apertures in the opposite end of each link and in the extended portion 258.

As shown in FIG. 15, the linkages 274, which comprise the second linkage assembly portion 262, are preferably connected to the jaws 241, 242, and 243 adjacent the top ends 272 thereof on the opposite side of the first linkage assembly portion 261 from the clamping surfaces 244, and to the central connector member 250 at positions substantially directly above the position where linkages 266 are mounted to the central connector member. As with the first linkage assembly portion, the link pin mounting between the jaws and the linkages 274 and between the linkages 274 and the extended portion 258 of the central connector member 250 are adapted to permit relative pivotal movement therebetween.

The pressure actuator assembly 280 includes a plurality of pressure actuators 281 which preferably comprise hydraulic actuators, although other types of actuators such as pneumatic actuators could also be utilized, if desired. Each hydraulic actuator 281 is connected to the jaws 241, 242, 243 adjacent the top ends 272 thereof and to the central connector member 250 as illustrated in FIG. 15.

Each hydraulic actuator 281 may be of generally conventional type and includes a cylinder 282 supporting a piston 283 (shown in dotted line in FIG. 15) for sliding longitudinal movement therein. The pistons 283 divide the cylinders 282 into chambers 292 and 293 on opposite sides of the pistons, and a piston rod 284 is connected to each piston and extends through the lower end of its respective cylinder 282 as shown. An apertured tab 286 extends from the top of each cylinder; a plurality of apertured tabs 287 extend from the central connector member 250; and each cylinder is pivotally mounted to the central connector member by a pin 288 extending through aligned apertures in the tabs 286 and in the adjacent tabs 287.

An apertured tab 289 also extends from the top end 272 of each of the jaws 241, 242, and 243 to pivotally mount the piston rods 284 to the jaws by pins 291 extending through aligned apertures in the tabs 289 and in the ends of adjacent piston rods 284.

Hydraulic actuators 281 are operated by applying hydraulic pressure to one or the other sides of pistons 283 by coupling either chamber 292 or 293 within each cylinder to a source of hydraulic pressure 301. More particularly, one end of fluid lines 294 and 296 communicate with chambers 292 and 293, respectively, through fittings 297 and 298, respectively, extending through the walls of each of the cylinders. The opposite ends of the fluid lines 294 and 296 from each actuator are connected to the hydraulic pressure source 301 via a fluid coupler 302. Coupler 302 comprises a dual rotary coupling having an inner flow path 306 and an outer annular flow path 307 allowing either of the chambers 292 or 293, respectively, of each of the actuators 281 to be simultaneously coupled to the source 301 to effect operation of the actuators. One particularly suitable coupling is that marketed by Deublin, their Model 1595. A valve 303 connected between the pressure source 301 and the coupler 302 is provided to control the application of fluid pressure to the desired one of the chambers 292 or 293 of the actuators 281, and is adapted to be operated by an appropriate control, schematically illustrated at 304. Fluid coupler 302 is preferably mounted within a central bore 310 of central connector member 250 as shown in FIG. 15.

In operation, the jaws of elevator 210 are initially placed in a first open position by retracting piston rods 284 into cylinder 282 by relieving hydraulic pressure from upper chamber 292 and applying hydraulic pressure to lower chamber 293 of each actuator 281. This will place the three jaws 241, 242, and 243 in the position illustrated by jaw 241 on the left-hand side of FIG. 15.

The elevator is then lowered over a section of pipe 230 until the jaws are aligned with the box end 232 of the pipe 230.

Hydraulic actuator assembly 280 is then operated by control 304 to relieve hydraulic pressure from the lower chambers 293 and to apply hydraulic pressure to the upper chambers 292 of the actuators 281 to push the pistons 283 downwardly to, in turn, push the piston rods 284 attached thereto out of the cylinders 282. The piston rods cause the upper ends 272 of the jaws to pivot outwardly and somewhat downwardly relative to central connector member 250 and, at the same time, due to the configuration of the linkage assembly, causes the lower ends 273 of the jaws to pivot inwardly. Jaws 241, 242, and 243 will pivot inwardly until clamping surfaces 244 on the jaws engage and clamp against the box end 232 of pipe 230 by bearing against the shoulder 234 that forms the lower end of box end 232. This second closed position of the jaws is illustrated by the position of jaw 242 on the right-hand side of FIG. 15.

When clamped by the jaws of the elevator 210, the pipe 230 can be pulled up by the requisite amount and then supported to permit removal to the topmost section of the pipe. Specifically, as described above, when the next joint on the pipe string becomes accessible, slips are engaged around the second topmost length of pipe to hold the string of pipe; and the topmost length of pipe is disengaged from the drill string, using either a wrench or tongs. The power swivel and elevator are used to finish unscrewing the thread at the lower end of the topmost pipe in the drill string, and a boom is brought in and clamped to the now disconnected topmost section of drill pipe.

The piston rods 284 of the actuators 281 are then again retracted into the cylinders 282 to cause the jaws to pivot back into their first open position to cause the clamping surfaces 244 of the jaws to move away from and release the pipe 230. The elevator can then be raised to remove the elevator from the pipe; the disconnected drill pipe section can be removed for storage; and the process repeated with a new section of pipe.

The entire process can also be repeated in reverse, as indicated previously, to lower the drill pipe into the bore hole, section by section.

While the pipe is being lifted upwardly or supported in position by the elevator, the central connector member 250 and the pipe 230 are urged apart by gravity due to the weight of the pipe. During such times, the configuration of the linkage assembly is such as to urge the lower ends 273 of the jaws inwardly into firm clamping engagement with the pipe. In fact, the configuration of the linkage assembly is such that the greater the force urging the connector member and the drill pipe apart, the greater the force with which the clamping surfaces of the jaws will clamp the drill pipe. At the same time, the positive force applied by the actuators 281 pushing the top ends 272 of each of the jaws outwardly will also cause the lower ends of the jaws to press inwardly against the pipe. Thus, the pipe will be held not only by the weight of the supported drill pipe, i.e, gravity, tending to pull the pipe and the central connector member apart, but by the positive force of the actuators as well; and this significantly increases the safety and reliability of the elevator as compared to those embodiments which rely solely on the force of gravity to support and lift the pipe.

In particular, with elevators which rely solely on gravity to support the drill pipe, skilled operators capable of precisely stopping and starting the vertical movement of the clamped drill string are required to avoid sudden release of the drill pipe as might occur if the central connector member is accidentally moved downwardly toward the drill pipe, when spinning the pipe or, generally, whenever the central connector member is moved in a direction other than vertically upward away from the drill pipe. Because a drill string can weigh several hundred thousand pounds, the risk of accidental release can present a significant safety hazard and the potential for substantial damage.

Also, because the embodiment of FIGS. 15–17 does not rely solely on gravity to hold the pipe, it is not necessary to maintain the elevator of this embodiment in the vertical mode for proper operation. Thus, the elevator can be effectively used in boreholes which are drilled at a non-vertical angle relative to the surface which is necessary or desirable in many applications.

The jaws of the elevator of FIGS. 15–17 can be effectively controlled from a remote location on the surface by simply operating valve 303. Precision stopping and starting of the movement of the elevator is not required. The elevator can also be more easily programmed and/or computer controlled and is especially suitable for use on automated and/or remotely controlled drilling or well service rigs.

A further feature of the elevator illustrated in FIGS. 15–17 is that it is designed to permit the drill string to be filled with drilling mud. Specifically, as is well known to those skilled in the art, high pressures within a borehole can sometimes cause mud or other materials to rise up within the hollow drill pipe while it is being raised and blow out of the top of the drill string. To prevent this from occurring, it is sometimes necessary to fill the drill string with drilling mud and to maintain the column of mud therein under a substantial static pressure applied from the surface while the drill string is being raised from the borehole.

With reference to FIG. 15, central connector member 250 is provided with a bore 310 extending substantially axially therethrough from the upper end thereof to the lower end. The upper end of the bore is internally threaded as shown at 311 to be threadedly engaged by the lower end of the swivel saver sub 205.

The lower end of the central connector member 250 is provided with a downwardly extending axial extended member 312 which is externally threaded as illustrated at 313. Extended member 312 is sized and configured to extend into and threadedly engage the internally threaded bore 314 of box end 232 of the uppermost section of drill pipe 230.

During normal operation of the elevator, the extended member 312 will not be threaded into the drill pipe 230, but will remain separated therefrom substantially as shown in FIG. 15. When, however, it is desired to fill the drill string with drilling mud, it is only necessary to screw the extended member 312 of the elevator into the drill pipe by rotating the elevator with the power swivel. Of course, the jaws should not be clamped to the drill pipe while this is being done, but should be in their open position as illustrated by jaw 241 in FIG. 15.

When the extended member 312 of the elevator is secured to the drill pipe 230, a continuous path is provided from the surface, through the power swivel and swivel saver sub, and through bore 310 extending through central connector member 250 and extended member 312 of elevator 210 into the hollow drill string; and the drill string may thus be readily filled with drilling mud and the column of mud maintained under pressure during subsequent operation of the elevator to raise the drill string.

The elevator illustrated in FIGS. 15-17 thus functions as a connector to place the power swivel and swivel saver sub in fluid communication with the drill string via its central bore 310.

It should be understood that a wide range of changes and modifications to the preferred embodiment described above can be made without departing from the scope of this invention. It is therefore intended that the foregoing detailed description be regarded as illustrative rather than limiting, and that it be understood that it is the following claims, including all equivalents, which are intended to define the scope of this invention.

We claim:

1. An elevator adapted for use with a power swivel for supporting a drilling or production tubular, said elevator comprising:
   at least two jaws, each jaw having a clamping surface;
   a connector member for supporting said jaws, said connector member comprising an upper end, a lower end, means for coupling the upper end to the power swivel, means for coupling the lower end to a tubular, and means for defining a passageway extending from the upper end to the lower end through said connector member to allow drilling mud to be passed from the power swivel through the bore, into the tubular; and
   linkage means mounted between said connector member and said jaws for coupling said jaws to said connector member and for maintaining said clamping surfaces of said jaws in clamping engagement with the tubular when said connector member and the tubular are urged apart relative to one another, said linkage means being configured such that the force by which the clamping surfaces clamp the tubular increases as the force urging the connector member and the tubular apart increases.

2. The elevator of claim 1 wherein said linkage means includes first and second linkage portions connected between said connecting member and each of said jaws, said first linkage portion being connected to said jaws at a position intermediate said second linkage portion and said clamping surfaces.

3. The elevator of claim 2 wherein said clamping surfaces are positioned on said jaws adjacent the lower ends thereof, said second linkage portion is connected to said jaws adjacent the upper snds thereof, and said first linkage is connected to said jaws at a generally central position thereon.

4. The elevator of claim 2 wherein said first and second linkage portions each include means for connecting said first and second linkage portions to said jaws for permitting relative pivotal movement therebetween, and means for connecting said first and second linkage portions to said connector member for permitting relative pivotal movement therebetween.

5. The elevator of claim 1 wherein said at least two jaws comprise three jaws.

6. The elevator of claim 1 and further including a pressure actuator assembly connected between said jaws and said connector member for additionally maintaining said clamping surfaces of said jaws in clamping engagement with said drill pipe.

7. The elevator of claim 6 wherein said pressure actuator assembly includes at least two pressure actuators, one connected to each of said at least two jaws.

8. The elevator of claim 7 wherein said linkage means includes means for connecting said jaws to said connector member for permitting relative pivotal movement therebetween, and wherein said clamping surfaces are positioned on said jaws adjacent the lower ends thereof and said pressure actuators are connected to said jaws adjacent the upper ends thereof such that said pressure actuators push said upper ends of said jaws outwardly for urging said clamping surfaces of said jaws inwardly into clamping engagement with said tubular.

9. The elevator of claim 7 wherein said pressure actuators are connected to said jaws and to said connector member.

10. The elevator of claim 9 wherein each of said pressure actuators comprises a respective hydraulic actuator.

11. The elevator of claim 10 wherein each of said hydraulic actuators includes a cylinder, a piston slidably positioned within said cylinder and a piston rod connected to said piston and extending outwardly from said cylinder, said cylinder being connected to said connector member and said piston rod being connected to one of said jaws, and wherein said actuator assembly further includes a source of hydraulic pressure, valve means for coupling said source of hydraulic pressure to said hydraulic actuators, and a control for controlling the operation of said hydraulic actuators.

12. The elevator of claim 11 wherein said control is located remotely from said actuators.

13. The elevator of claim 1 wherein said means for coupling the lower end to the tubular includes an externally threaded extended member extending downwardly from the lower end thereof and configured to threadedly engage said tubular.

14. The invention of claim 1 wherein the neans for coupling the upper end to the power swivel comprises means for threadedly engaging the upper end of the connector member to a sub which is in turn mounted to the power swivel.

15. An elevator adapted for use with a power swivel for supporting a drilling or production tubular, said elevator comprising:

a connector member comprising an upper end, a lower end, means for coupling the upper end to the power swivel, means for coupling the lower end to a tubular, and means for defining a passageway extending from the upper end to the lower end through said connector member to allow drilling mud to be passed from the power swivel through the bore, into the tubular; and at least two jaws, each jaw having a clamping surface and being supported by the connector member for movement between a first open position and a second closed position in which said clamping surfaces are in clamping engagement with a tubular; and a pressure actuator assembly connected between said jaws and said connector member for maintaining said jaws in said second closed position in clamping engagement with said tubular.

16. The elevator of claim 15 wherein said pressure actuator assembly includes at least two pressure actuators, one connected to each of said at least two jaws.

17. The elevator of claim 16 wherein each of said at least two pressure actuators comprise fluid actuators.

18. The elevator of claim 16 and further including linkage means extending between said connector member and said jaws for supporting said jaws for pivotal moverent between said first open position and said second closed position.

19. The elevator of claim 18 wherein said clamping surfaces are positioned on said jaws adjacent the lower ends thereof and said pressure actuators are connected to said jaws adjacent the upper ends thereof, and wherein said pressure actuators urge said upper ends of said jaws outwardly to urge said clamping surfaces inwardly to maintain said clamping surfaces in clamping engagement with said tubular.

20. The elevator of claim 16 wherein said pressure actuator assembly further includes means for moving said jaws from said first open position to said second closed position, and from said second closed position to said first open position.

21. The elevator of claim 20 wherein each of said pressure actuators comprise fluid actuators and wherein said moving means includes a source of fluid pressure, means for coupling each of said fluid actuators to said source of fluid pressure, and a control for controlling the application of fluid pressure to said fluid actuators.

22. The elevator of claim 21 wherein said control is remotely located relative to the location of said actuators.

23. The elevator of claim 21 wherein each of said fluid actuators comprises a cylinder, a piston slidably positioned within said cylinder, and a piston rod connected to said piston and extending outwardly from said cylinder and connected to one of said jaws, said control controlling the movement of said piston within said cylinder for controlling movement of said jaws from said first open position to said second closed position and from said second closed position to said first open position.

24. The elevator of claim 15 wherein said pressure actuator assembly further includes means for moving said jaws from said first open position to said second closed position, and from said second closed position to said first open position.

25. The invention of claim 15 wherein the means for coupling the upper end to the power swivel comprises neans for threadedly engaging the upper end of the connector member to a sub which is in turn mounted to the power swivel.

26. An elevator adapted for use with a power swivel for supporting a drilling or production tubular, said elevator comprising:

at least two jaws, each jaw having a clamping surface adjacent the lower end thereof;

a central connector member for supporting said jaws, said connector member comprising an upper end, a lower end, neans for coupling the upper end to the power swivel, means for coupling the lower end to a tubular, and means for defining a passageway extending from the upper end to the lower end through said connector member to allow drilling mud to be passed from the power swivel through the bore, into the tubular;

linkage means for coupling said jaws to said central connector member for permitting pivotal movement of said jaws relative to said central connector member, said linkage means including a first linkage portion pivotally connected to each of said jaws at a generally central position thereon, and a second linkage portion pivotally connected to each of said jaws adjacent the upper end thereof;

a pressure actuator connected between the connector member and each of said jaws adjacent the upper end thereof; and a control for controlling said pressure actuators for urging said clamping surfaces into clamping engagenent with a tubular, said linkage means further maintaining said clamping surfaces in clamping engagement with said tubular when said central connector member is urged away from said tubular, said linkage means being configured such that the force by which said clamping surfaces clamp the tubular increases as the force urging the central connector member and the tubular apart increases.

27. An elevator as recited in claim 26 wherein each pressure actuator is pivotally connected to its respective jaw and to said central connector member.

28. The elevator of claim 26 wherein said means for coupling the lower end to the tubular includes an externally threaded extended member extending downwardly from the lower end thereof and configured to threadedly engage said tubular.

29. The invention of claim 26 wherein the means for coupling the upper end to the power swivel comprises means for threadedly engaging the upper end of the connector member to a sub which is in turn mounted to the power swivel.

30. An elevator for supporting a drilling or production tubular comprising:

at least two jaws, each jaw having a clamping surface adjacent the lower end thereof;

a central connector member for supporting said jaws;

at least two fluid actuators, each fluid actuator being connected to one of said jaws adjacent the upper end thereof and coupling its respective jaw to said central connector member;

linkage means connected to each of said jaws between said upper and lower end thereof and coupling said jaws to said central connector member for pivotal movement between a first open and a second closed position, said linkage means including a first linkage portion pivotally attached to said jaws at a generally central position thereon and pivotally attached to said central connector member, and a second linkage portion pivotally attached to said jaws adjacent the upper ends thereof and pivotally attached to said central connector member; and a control coupled to said fluid actuators for operating said actuators for maintaining said jaws in said second closed position to maintain said clamping surfaces in clamping engagement with said tubular, said linkage assembly being configured for further maintaining said clamping surfaces in clamping engagement with said tubular when said central connector member is urged away from said tubular due to the weight of said tubular, and being configured such that the force by which the clamping surfaces clamp the tubular increases as the force urging the central connector member and the tubular apart increases.

31. An elevator as recited in claim 30 wherein said control includes means for operating said fluid actuators for moving said jaws between said first open and said second closed positions.

* * * * *

UNITED STATES PATENT AND TRADEMARK OFFICE
CERTIFICATE OF CORRECTION

PATENT NO. : 4,650,236

DATED : March 17, 1987

INVENTOR(S) : Keith M. Haney et al.

It is certified that error appears in the above-identified patent and that said Letters Patent is hereby corrected as shown below:

In column 1, line 29, please delete "nuxber" and substitute therefor --number--.

In column 1, line 54, after "acceptable", please insert -- . --.

In column 12, line 6, please delete "snds" and substitute therefor --ends--.

In column 12, line 61, please delete "neans" and substitute therefor --means--.

In column 13, line 27, please delete "moverent" and substitute therefor --movement--.

In column 13, line 68, please delete "neans" and substitute therefor --means--.

UNITED STATES PATENT AND TRADEMARK OFFICE
CERTIFICATE OF CORRECTION

PATENT NO. : 4,650,236

DATED : March 17, 1987

INVENTOR(S) : Keith M. Haney et al.

It is certified that error appears in the above-identified patent and that said Letters Patent is hereby corrected as shown below:

In column 14, line 10, please delete "neans" and substitute therefor --means--.

In column 14, line 61, please delete "end" and substitute therefor --ends--.

Signed and Sealed this

Fifth Day of September, 1989

Attest:

*Attesting Officer*

DONALD J. QUIGG

*Commissioner of Patents and Trademarks*